United States Patent
Roth

(10) Patent No.: US 7,610,577 B1
(45) Date of Patent: Oct. 27, 2009

(54) METHOD FOR DEVELOPING PLATFORM INDEPENDENT LAUNCHABLE APPLICATIONS

(75) Inventor: Mark Roth, Brooklyn, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 696 days.

(21) Appl. No.: 10/978,517

(22) Filed: Nov. 1, 2004

Related U.S. Application Data

(60) Provisional application No. 60/575,625, filed on May 29, 2004.

(51) Int. Cl.
G06F 9/44 (2006.01)
(52) U.S. Cl. .................... 717/106; 717/140; 709/246
(58) Field of Classification Search ............. 717/106
See application file for complete search history.

(56) References Cited

U.S. PATENT DOCUMENTS

| | | | | |
|---|---|---|---|---|
| 5,754,858 | A * | 5/1998 | Broman et al. | 717/111 |
| 6,112,225 | A * | 8/2000 | Kraft et al. | 709/202 |
| 6,286,134 | B1 * | 9/2001 | Click et al. | 717/138 |
| 6,463,457 | B1 * | 10/2002 | Armentrout et al. | 709/201 |
| 6,799,209 | B1 * | 9/2004 | Hayton | 709/223 |
| 7,080,159 | B2 * | 7/2006 | Chu et al. | 709/246 |
| 2002/0196294 | A1 * | 12/2002 | Sesek | 345/867 |
| 2003/0056204 | A1 * | 3/2003 | Broussard | 717/140 |

OTHER PUBLICATIONS

Jordan Ayala, Windows 2000 Server Services, Part 1, Nov. 2001; retrieved from http://www.microsoft.com/technet/prodtechnol/windows2000serv/maintain/featusability/servsvc1.mspx on Sep. 6, 2007.*

Angelo Corsaro and Corrado Santoro, "A C++ Native Interface for Interpreted JVMs", On The Move to Meaningful Internet Systems 2003: OTM 2003Workshops, Springer-Verlag Berlin Heidelberg, 2003.*

* cited by examiner

*Primary Examiner*—Wei Y Zhen
*Assistant Examiner*—Phillip H Nguyen
(74) *Attorney, Agent, or Firm*—Brooks Kushman P.C.

(57) ABSTRACT

A method, computer program product, and system for providing launchable application source code are presented. A determination is made regarding which target platforms a launchable application executable will be run on. Once the platforms have been determined, a cross platform executable is generated using the launchable application source code. Platform specific executables are also generated for each selected platform. The cross platform executable is then combined with the platform specific executable for the platform to provide the platform independent launchable application. The platform specific executable is launched by an Operating System as part of a system service, such as a screensaver, and calls the cross platform executable which is executed on a virtual machine running on the platform.

12 Claims, 3 Drawing Sheets

METHOD FOR DEVELOPING PLATFORM INDEPENDENT LAUNCHABLE APPLICATIONS

CROSS REFERENCE TO RELATED APPLICATIONS

The present application claims the benefit of U.S. Provisional Patent Application No. 60/575,625, filed on May 29, 2004, the teachings of which are incorporated herein by reference in their entirety.

BACKGROUND

A launchable application is a program that is automatically executed at certain time intervals or under a certain set of conditions. One example of a launchable application is a screensaver. Screensavers originated as a way to prevent an image from burning in to a display monitor. When the same image is left on a monitor for a period of time without the image changing at all, the monitor can be damaged. When the same image is displayed continuously, the phosphorous inside the monitor stays permanently "burned" with the image. This phenomenon is commonly referred to as "burn-in". Screensavers are designed to constantly show new images on the screen, thereby avoiding burn-in. Screensavers are typically configured to launch automatically when a monitor has been unused for a predetermined period of time.

Though modern monitors are less susceptible to burn-in, screensavers remain popular and have since evolved to serve as a form of entertainment and as an entry point for a system's idle cycles to be used for grid/distributed computing. One example of grid/distributed computing is the Search for Extraterrestrial Intelligence (SETI). SETI is a scientific experiment that uses Internet-connected computers in the search for extraterrestrial intelligence. Users participate by running a program that downloads and analyzes radio telescope data during the computers idle time, (i.e., when a screen saver would be invoked).

Another example of a launchable application is a backup application. It is quite common for computer systems to perform periodic backups of files stored in a data storage system. Backing-up files typically involves transferring a copy of the file stored on the disks within a data storage system to another medium, such as magnetic tape. Backing-up files protects against data loss in the event of disk or data storage system failures. Backup operations are typically performed at set time intervals.

SUMMARY

Conventional mechanisms such as those explained above suffer from a variety of drawbacks. One such drawback is that it is difficult to develop launchable applications in a platform independent manner, since the launchable application may require access to a specific machine dependent interface.

As used herein, a platform is defined as a combination of an operating system and the underlying hardware architecture an application runs on. Cross-platform is defined as the ability to run an application on more than one platform. Conventional launchable Application Program Interfaces (APIs) are specific to a single platform or family of platforms, and as such do not allow a developer to write a launchable application once and have the launchable application run on any platform. Previously, launchable applications had to be written individually for each target platform. As a result, some launchable applications are only available for certain platforms.

Embodiments of the invention significantly overcome such drawbacks and provide mechanisms and techniques that provide a method of developing platform independent launchable applications.

A particular embodiment of a method for developing platform independent launchable applications combines a Virtual Machine (VM) with a set of abstraction layers for the set of platforms the developers would like to support. Virtual Machine is a term used to describe software that acts as an interface between compiler binary code and the hardware platform that actually performs the program's instructions. A Virtual Machine specifies an instruction set, a set of registers, a stack, a "garbage heap," and a method area. Once a VM has been provided for a platform, programs can run on that platform by way of the VM.

The present method for developing platform independent launchable applications results in developers saving time by writing the launchable application source code only once for all platforms rather than once for each platform. Accordingly, there is less code to maintain, support for additional platforms can be added without changing the source code of existing launchable applications, the launchable application settings can be specified in an easy to write configuration file, and the developer does not need to write the user interface code for configuring the launchable application as the code is generated automatically by a launchable application System Development Kit (SDK) for each target platform.

In a particular embodiment, a method of developing a platform independent launchable application includes providing launchable application source code. The launchable application, for example, may be a screen saver, a backup application, or similar type application. Next, the target platforms are determined. The target platform may be selected from one or more of a Windows platform, a Linux platform, a Macintosh platform or similar type platform. Once the platforms have been determined, a cross platform executable is generated using the launchable application source code. A platform specific executable is also generated for each selected platform. The platform specific executable is launched by an Operating System as part of a system service. The cross platform executable is called by the platform specific executable and is executed on the virtual machine running on the platform.

Other embodiments include a computer readable medium having computer readable code thereon for providing a platform independent launchable application. The medium includes instructions for providing launchable application source code and instructions for determining target platforms to generate a launchable application executable for. The medium further includes instructions for generating a cross platform executable using the launchable application source code and instructions for generating a platform specific executable. The medium also includes instructions for invoking the cross platform executable on the virtual machine by the platform specific executable, and instructions for launching the platform specific executable by an Operating System as part of a system service.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a platform independent launchable application as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a platform independent launchable application as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method, computer program product and system for providing a platform independent launchable application is presented. By way of such a method, computer program product and system, a developer has the luxury of writing the launchable application source code once and is then able to run the resulting launchable application on all of the desired target platforms without the need to modify the source code. In addition to providing a way to develop platform independent applications, this present invention also provides a way for the end user to configure each launchable application in a platform independent manner.

Figure 1:
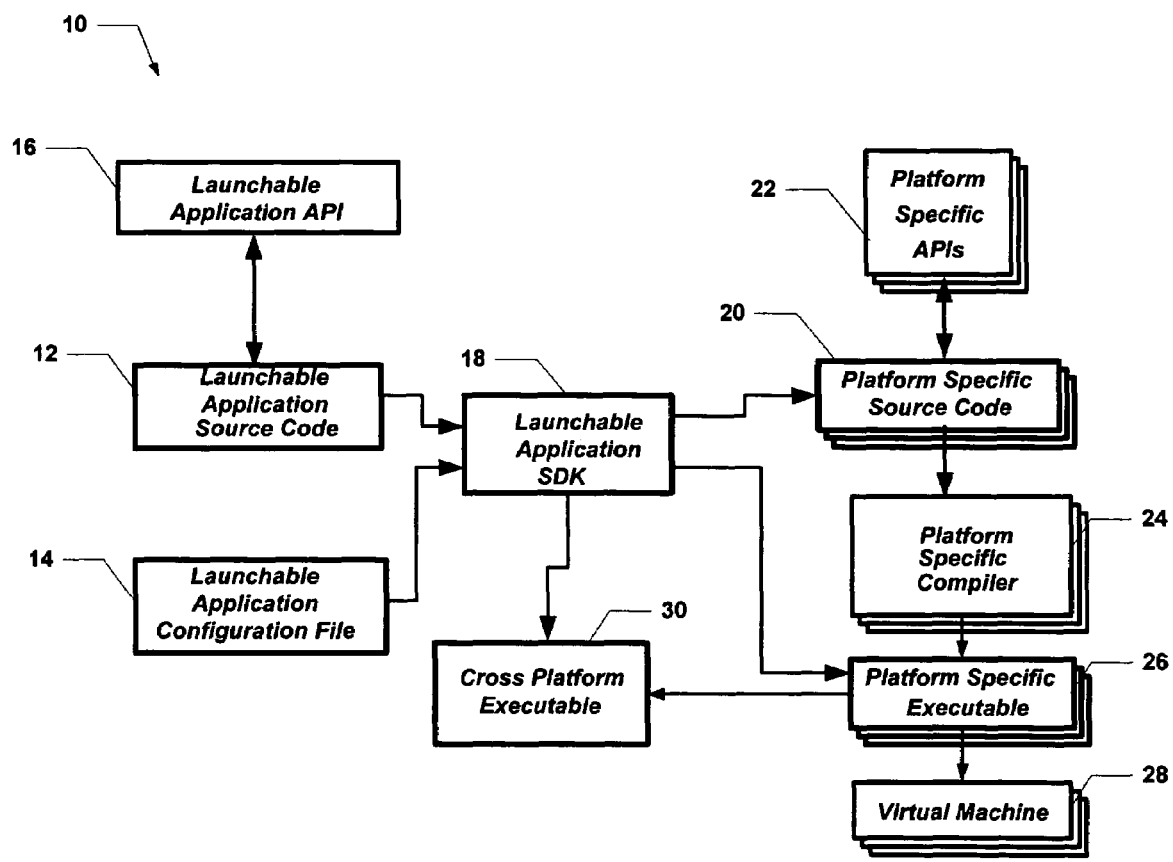
FIG. 1 is a block diagram showing an example environment for providing a platform independent launchable application in accordance with embodiments of the invention.

Referring now to FIG. 1, an example environment 10 for providing a platform independent launchable application is shown. The environment 10 includes launchable application source code 12 and a launchable application configuration file 14. The launchable application source code 12 is the set of code and supporting files that comprise the launchable application utility. The launchable application source code is developed in conjunction with the launchable application API 16. The launchable application API 16 is the set of classes and interfaces the developer writes the cross platform launchable application to. The launchable application configuration file 14 is the file or set of files that the developer provides containing information about the launchable application. This information may contain launchable application setting parameters and other information about the launchable application. The launchable application configuration file provides information about the settings a launchable application accepts.

A launchable application Software Development Kit (SDK) 18 receives the launchable application source code 12 and the launchable application configuration file 14. The launchable application SDK 18 is a development kit containing tools and utilities to turn the launchable application source code into a set of executables that can be used to run the launchable application on any platform. The launchable application SDK 18 provides two outputs. One output is platform specific source code 20. The platform specific source code 20 is a set of intermediary files that are used to generate the platform specific executable. Another output from the launchable application SDK 18 is a cross platform executable 30. The cross platform executable 30 is the portion of the launchable application executable that is run on a virtual machine and is the same for each target platform. The launchable application SDK 18 processes the configuration file 14 and generates the code necessary for each platform to provide a configuration interface to the end user to configure the launchable application. As each platform provides a different configuration mechanism for launchable applications, the code generated for each platform may be different.

The platform specific source code 20 is combined with platform specific APIs 22 and provided to a platform specific compiler 24. The platform specific APIs 22 are those APIs available for each of the target platforms the developer wishes to have the launchable application run on. The platform specific compilers 24 are those compilers available for each of the target platforms that compile the platform specific source code 20 into a platform-specific executable 26.

The platform specific executable 26 is the portion of the launchable application executable that is run natively and may be different for each target platform. The platform specific executable 26 runs on the platform as well as calling the cross platform executable 30. Virtual Machines 28 are those virtual machines available for each of the target platforms that can run a cross platform executable. The same cross platform executable is run on each virtual machine of each platform. With such an environment 10, platform independent launchable applications can be developed.

Figure 2:
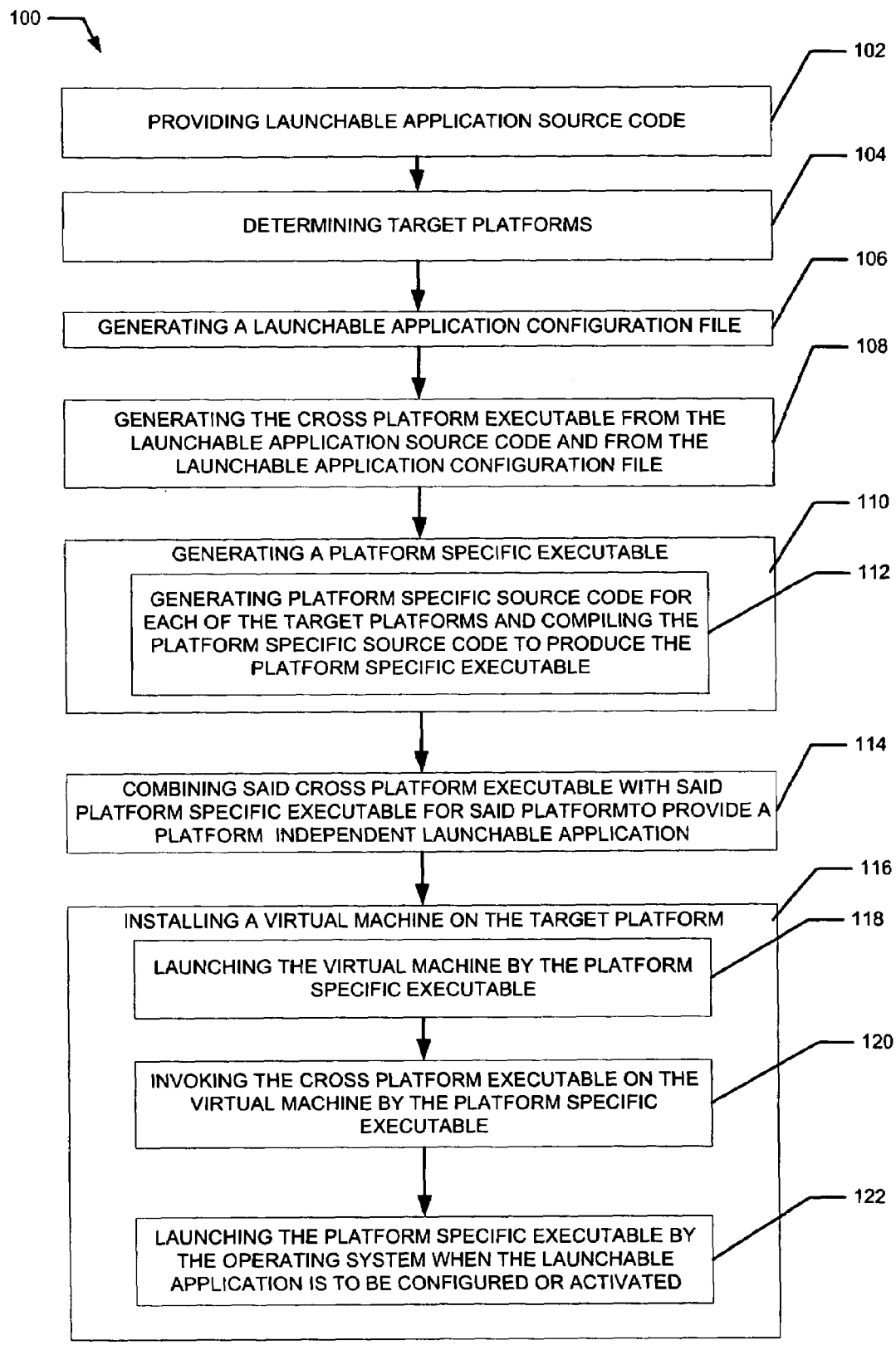
FIG. 2 is a flow diagram of a particular embodiment of a method for providing a platform independent launchable application.

A flow chart of the presently disclosed method of developing platform independent launchable applications is depicted in FIG. 2. The method 100 incorporates the functional blocks shown in FIG. 1 in a methodology to develop platform independent launchable applications. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for developing a platform independent launchable application is shown. The method starts with processing block 102 wherein launchable application source code is provided. The developer creates the launchable application source code, which depends on the launchable application API. The developer uses the utilities in the launchable application SDK to process the launchable application source code and launchable application configuration file.

In processing block 104, target platforms are determined. The developer configures the utilities with the set of target platforms to generate launchable application executables for. A launchable application executable will be generated for each target platform. The target platform may include one or more of a Windows platform, a Linux platform, a Macintosh platform or similar type platform.

In processing block 106, a launchable application configuration file is generated. The launchable application configuration file is the file or set of files that the developer provides containing information about the launchable application. This information may contain launchable application setting parameters and other information about the launchable application.

In processing block 108, a cross platform executable is generated using the launchable application source code and the launchable application configuration file. The launchable application SDK generates one cross platform executable. The same cross-platform executable will run on a virtual machine for each target platform.

In processing block 110, a platform specific executable is generated. In processing block 112, the platform specific executable described in processing block 110 is generated by generating platform specific source code for each of the target platforms and compiling the platform specific source code to produce the platform specific executable. The launchable application SDK generates one platform specific source code set for each target platform configured by the developer. Each set of platform specific source code depends on the platform specific APIs for that platform. For each target platform, the platform specific source code for that platform is compiled with the platform specific compiler for that platform to generate a platform specific executable.

In processing block 114, the cross platform executable is combined with the platform specific executable for the platform. The developer creates a package for each platform by combining the cross platform executable with the platform specific executable for that platform.

In processing block 116, a virtual machine is installed on the target platform. The end user selects the appropriate launchable application package for their operating system and installs the launchable application per their operating system's launchable application plugin mechanism.

In processing block 118, the virtual machine is launched by the platform specific executable. The platform specific executable finds the virtual machine installed on the end user's system and launches it.

In processing block 120 the cross platform executable is invoked on the virtual machine by the platform specific executable. In processing block 122 the platform specific executable is launched by the operating system when the launchable application is to be configured or activated.

Figure 3:
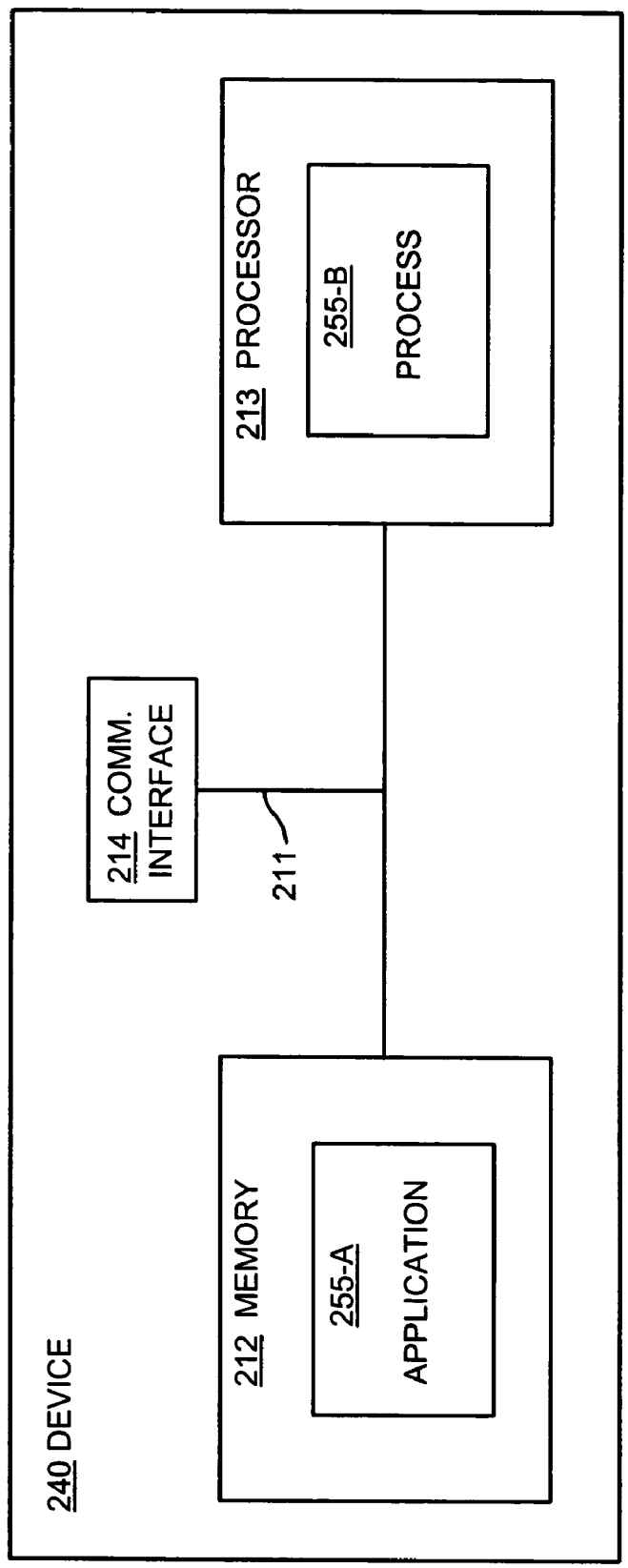
FIG. 3 illustrates an example computer system architecture for a computer system that provides a platform independent launchable application in accordance with embodiments of the invention.

Referring now to FIG. 3, an example architecture of a computer system that is configured as a host computer system 240 is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the hose in order to produce a corresponding agent process 255-B. In other words, the agent process 255-B represents one or more portions of the agent application 255-A performing within or upon the processor 213 in the computer system. It is to be understood that the agent 255 operates as explained in former examples and is represented in FIG. 3 by the agent application 255-A and/or the process 255-B. The processor 213, when operating in accordance with the application 255-A is configured to perform the operations of the processing blocks depicted in FIG. 2.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of developing a platform independent launchable application based on launchable application source code, the method comprising:
   generating a launchable application configuration file;
   generating a cross platform executable using said launchable application source code and said launchable application configuration file for processing by a virtual machine;
   generating a platform specific executable for a selected target platform including generating platform specific source code and compiling the platform specific source code using platform specific APIs so that the platform specific executable runs natively on the target platform;
   combining said cross platform executable with said platform specific executable for said selected target platform;
   invoking said cross platform executable on said virtual machine by said platform specific executable; and
   launching, by an Operating System of the target platform as part of a system service and without using a virtual machine, said platform specific executable so the platform specific executable runs natively on the target platform.

2. The method of claim 1 further comprising installing a virtual machine on said target platform.

3. The method of claim 2 further comprising launching said virtual machine by said platform specific executable.

4. The method of claim 1 wherein said platform independent launchable application comprises a screensaver.

5. A computer program product, stored on computer usable medium, including instructions that, when executed on a processor, provide a platform independent launchable application, enabling the processor to perform operations of:
   generating a launchable application configuration file;
   generating a cross platform executable using launchable application source code and the launchable application configuration file;
   generating a platform specific executable for a selected target platform using said launchable application source code including compiling the platform specific source code using platform specific APIs associated with the selected target platform such that the platform specific executable runs natively on the target platform without interpretation by a virtual machine;
   combining said cross platform executable with said platform specific executable for said platform;
   invoking said cross platform executable via a virtual machine by said platform specific executable; and
   launching, by an Operating System of the target platform as part of a system service and without using a virtual machine, said platform specific executable.

6. The computer program product of claim 5 further comprising installing the virtual machine on said target platform.

7. The computer program product of claim 6 further comprising launching said virtual machine by said platform specific executable.

8. The computer program product of claim 7 wherein said platform independent launchable application comprises a screensaver.

9. A computer system comprising:
   a memory;
   a processor;
   a communications interface;
   an interconnection mechanism coupling the memory, the processor and the communications interface; and
   wherein the memory is encoded with instructions causing the computer system to perform the operations of:
      generating a launchable application configuration file;
      generating a cross platform executable using launchable application source code and the launchable application configuration file;
      generating a platform specific executable for a selected target platform using said launchable application source code by compiling platform specific source code using platform specific APIs for the target platform so that the platform specific executable executes natively on the target platform;
      combining said cross platform executable with said platform specific executable for said platform; and
      invoking said cross platform executable on a virtual machine by said platform specific executable after launching of said platform specific executable by an operating system of the target platform as part of a system service without using a virtual machine.

10. The computer system of claim 9 wherein said generating a platform specific executable comprises generating platform specific source code for each of a plurality of target platforms.

11. The computer system of claim 9 further comprising installing said virtual machine on said target platform.

12. The computer system of claim 11 further comprising launching said virtual machine by said platform specific executable.

* * * * *

UNITED STATES PATENT AND TRADEMARK OFFICE
CERTIFICATE OF CORRECTION

PATENT NO. : 7,610,577 B1
APPLICATION NO. : 10/978517
DATED : October 27, 2009
INVENTOR(S) : Mark Roth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

Twelfth Day of October, 2010

David J. Kappos
*Director of the United States Patent and Trademark Office*